United States Patent
Yu et al.

(10) Patent No.: US 10,148,312 B2
(45) Date of Patent: Dec. 4, 2018

(54) CIRCUIT AND METHOD TO REDUCE FUNDAMENTAL AND MODULATION SPURS WITH SPREAD SPECTRUM

(71) Applicant: TEXAS INSTRUMENTS INCORPORATED, Dallas, TX (US)

(72) Inventors: Theodore Ernest Yu, San Jose, CA (US); Yogesh Kumar Ramadass, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 120 days.

(21) Appl. No.: 15/072,735

(22) Filed: Mar. 17, 2016

(65) Prior Publication Data

US 2017/0272116 A1    Sep. 21, 2017

(51) Int. Cl.
*H04B 1/00*  (2006.01)
*H04B 1/69*  (2011.01)

(52) U.S. Cl.
CPC .................................... *H04B 1/69* (2013.01)

(58) Field of Classification Search
CPC ...... H03C 3/0966; H03C 3/0941; H04B 1/69; H04B 2215/064; H04B 7/216; H04B 15/00; H04B 1/692; G01S 13/345; G01S 13/82; G06F 1/08; G09G 2330/06; H04L 1/205
See application file for complete search history.

(56) References Cited

U.S. PATENT DOCUMENTS

| | | | |
|---|---|---|---|
| 5,488,627 A | 1/1996 | Hardin et al. | |
| 7,389,095 B1* | 6/2008 | Liu | H04B 15/02 331/16 |
| 8,558,497 B2* | 10/2013 | Wright | H03K 7/08 318/34 |
| 2008/0157894 A1* | 7/2008 | Hariton | H03K 7/08 332/109 |

OTHER PUBLICATIONS

Kumar et al., "Reducing EMI in digital systems through spread spectrum clock generators," Cypress Semiconductor Application Note (Feb. 2011).
ON Semiconductor, "A Solution for Peak EMI Reduction with Spread Spectrum Clock Generators," Application Note AND9015 (Jul. 2011).
Lin et al., "Reduction of Power Supply EMI Emission by Switching Frequency Modulation," IEEE Trans. On Power Electronics, vol. 9, No. 1 (Jan. 1994).

* cited by examiner

*Primary Examiner* — Rahel Guarino
(74) *Attorney, Agent, or Firm* — Michael A. Davis, Jr.; Charles A. Brill; Frank D. Cimino

(57) ABSTRACT

A method of generating a spread spectrum signal is disclosed. The method includes selecting a first pseudorandom slope for a modulation curve. A current frequency on the modulation curve is selected. An oscillating signal is produced at the current frequency for a respective time. The current frequency is set to a next frequency on the modulation curve. The steps of producing an oscillating frequency and setting the current frequency to a next frequency are (Continued)

repeated until the current frequency is a final frequency on the modulation curve.

15 Claims, 12 Drawing Sheets

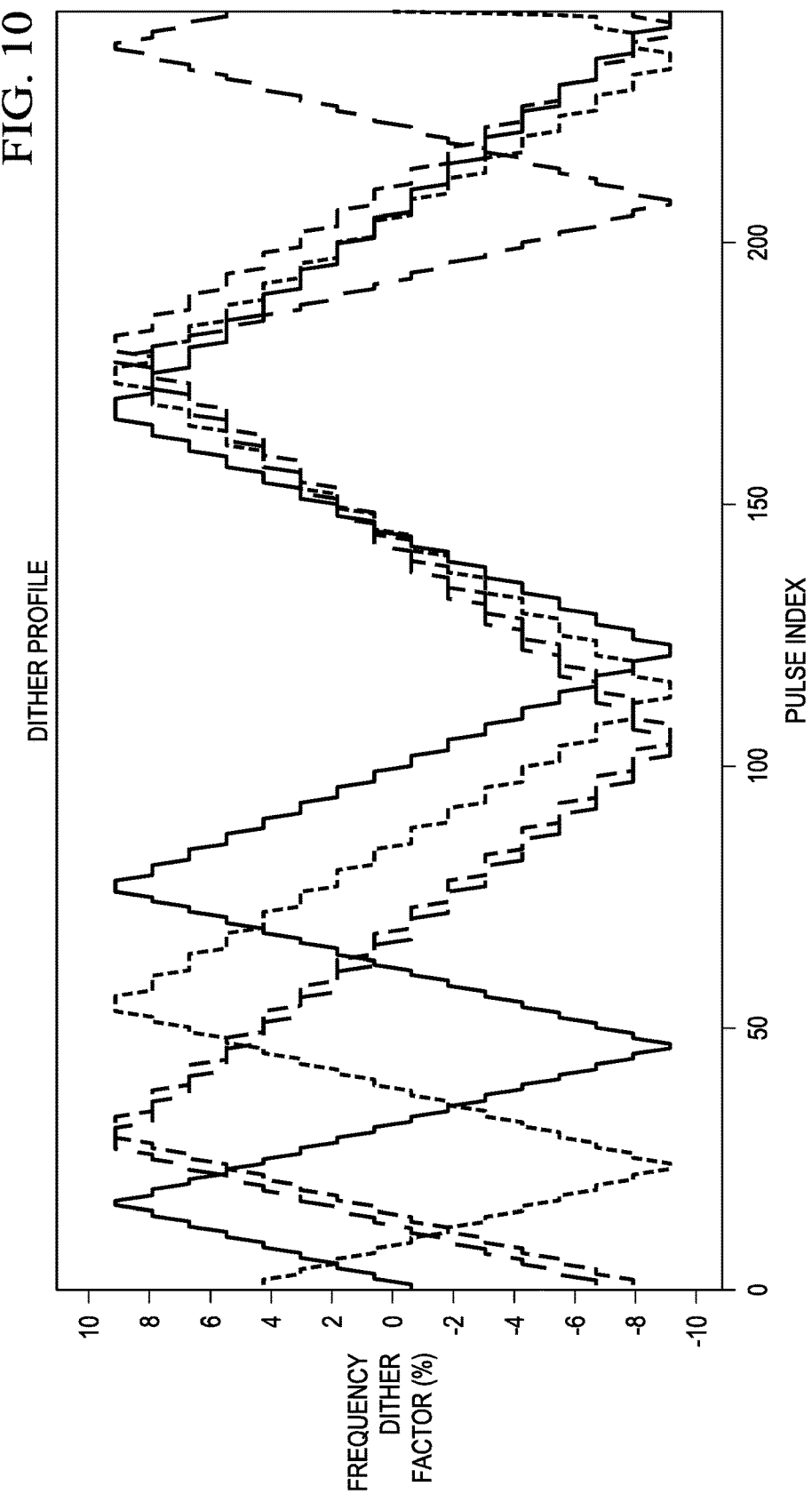

CIRCUIT AND METHOD TO REDUCE FUNDAMENTAL AND MODULATION SPURS WITH SPREAD SPECTRUM

BACKGROUND OF THE INVENTION

Embodiments of the present invention relate to spread spectrum solutions for electromagnetic interference (EMI) in switched mode power supplies by utilization of spread spectrum switching frequencies.

Switched mode power supplies, due to the nature of their switching behavior, introduce spectral spurs at their fundamental switching frequency and corresponding harmonics. These spurs are referred to as electromagnetic interference (EMI) and are regulated by the CISPR, FCC and other standards. FIG. 1B illustrates an EMI spur for a 2.2 MHz fundamental frequency at −24.2 dB. This is for a square wave with no spread spectrum switching. FIG. 1A illustrates a corresponding low frequency spur at −79.7 dB associated with harmonics of the 2.2 MHz fundamental frequency. Board level solutions to such interference typically utilize a combination of shielding or filter techniques to suppress EMI spurs in order to comply with regulations and design specifications. However, board level methods to mitigate EMI through layout techniques fail to address the source of noise generation. Best practice layout techniques can only mitigate the introduction of additional EMI noise by minimizing current conducting loop area, filtering, shielding, and use of ground planes. Furthermore, these methods increase system cost as well as solution size.

Spread spectrum switching is a control technique to dither or change the switching frequency over a predetermined bandwidth. This reduces the EMI spur at the fundamental frequency by spreading the spectral energy over adjacent frequencies. There are two broad categories for spread spectrum algorithms. In the first category of fixed pattern dither algorithms, Apps Team, "A Solution for Peak EMI Reduction with Spread Spectrum Clock Generators," ON Semiconductor Application Note AND9015, (July 2011) disclose triangular (FIG. 1) and Hershey Kiss (FIG. 2) spread spectrum profiles. Kumar et al., "Reducing EMI in Digital Systems Through Spread Spectrum Clock Generators," Cypress Semiconductor Application Note published in EE Times Design, 1, 16 (February 2011) also compare triangular (FIG. 5a) and Hershey Kiss (FIG. 5b) spread spectrum profiles. Hardin et al., U.S. Pat. No. 5,488,627 discuss various fixed pattern, spread spectrum profiles. Details of the foregoing references are incorporated by reference herein in their entirety. Fixed pattern dither algorithms provide the best reduction of fundamental frequency spurs at the cost of introducing large spurs at the modulation frequency of their fixed patterns. This additional spectral noise is further exacerbated when optimizing for the CISPR/FCC specifications and results in modulation spurs being placed in the audio band around 9 kHz. This may cause an undesirable hum in switching power supplies operating in the MHz range.

FIG. 3B illustrates the spectral energy of a fixed pattern, triangular modulation curve of the prior art with a 2.2 MHz center frequency. The spectral energy is spread between 2.0 MHz and 2.4 MHz with a maximum of −36.6 dB. FIG. 3A illustrates a corresponding low frequency spectrum having a dominant EMI spur of −76.6 dB at 9.2 kHz. By way of comparison, FIG. 4B illustrates the spectral energy of a fixed pattern, Hershey Kiss modulation curve of the prior art with a 2.2 MHz center frequency. The spectral energy is spread between 2.0 MHz and 2.4 MHz with a maximum of −29.2 dB. FIG. 4A illustrates a corresponding low frequency spectrum having a dominant EMI spur of −77.9 dB at 1.0 kHz. Both triangular and Hershey Kiss modulation curves reduce EMI with spread spectrum switching. However, both produce corresponding low frequency EMI spurs in the audio band due to their respective modulation frequencies.

In the second category of spread spectrum algorithms, Lin et al., "Reduction of Power Supply EMI Emission by Switching Frequency Modulation," IEEE Trans. on Power Electronics, Vol. 9, No. 1, 132, 137 (January 1994) disclose a pseudorandom dither algorithm of spread spectrum switching. Details of the foregoing reference are incorporated by reference herein in their entirety. Pseudorandom variation of the fundamental frequency, however, provides inferior fundamental spur reduction but decreases other spectral content. This is illustrated at FIG. 2B where fundamental frequency spectral energy is spread between 1.8 MHz and 2.6 MHz. A large spur of −27.3 dB still exists at the 2.2 MHz center frequency. However, corresponding low frequency spurs of FIG. 2A have a maximum noise floor of −84.9 dB.

The foregoing spread spectrum algorithms reduce EMI at the source through spread spectrum techniques. However, the present inventors have realized a need to further reduce EMI in switching power supplies. Accordingly, the preferred embodiments described below are directed toward improving upon the prior art.

BRIEF SUMMARY OF THE INVENTION

In a preferred embodiment of the present invention, a method of generating a spread spectrum signal is disclosed. The method includes selecting a first pseudorandom slope for a modulation curve and selecting a current frequency on the modulation curve. The method further includes producing an oscillating signal at the current frequency for a respective time and setting the current frequency to a next frequency on the modulation curve. The steps of producing the oscillating signal and setting the current frequency to a next frequency are repeated until the current frequency is a final frequency on the modulation curve.

BRIEF DESCRIPTION OF THE SEVERAL VIEWS OF THE DRAWING

FIG. 10 is a diagram of dither profiles showing fundamental frequency variation of four modulation curves as a percent of the center frequency with a pseudorandom modulation frequency.

DETAILED DESCRIPTION OF THE INVENTION

The preferred embodiments of the present invention provide significant advantages over the prior art in EMI reduction of switching power supplies as will become evident from the following detailed description.

Figure 5:
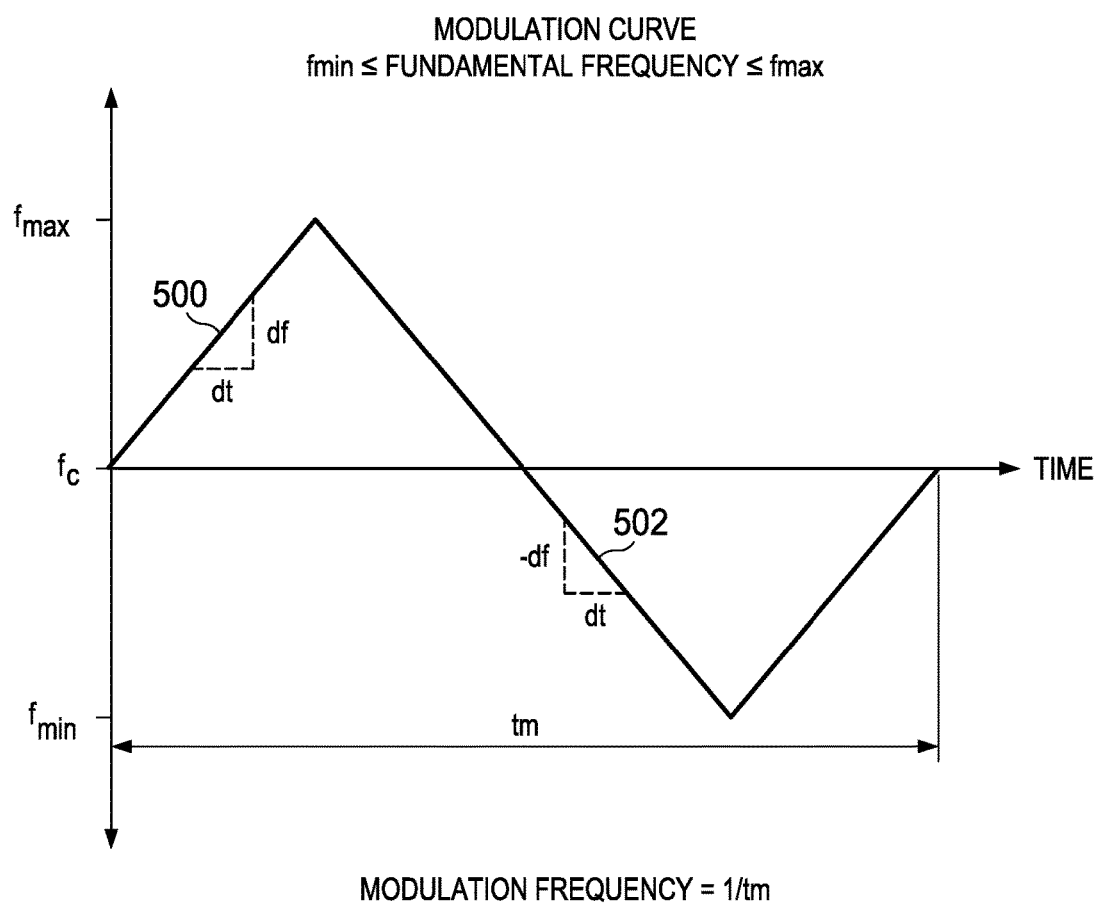
FIG. 5 is a diagram illustrating a modulation curve having spread spectrum fundamental frequencies and a modulation frequency.

Referring to FIG. 5, there is a diagram illustrating a Modulation Curve having spread spectrum Fundamental Frequencies and a Modulation Frequency. Terms defined in this diagram will be used in the following discussion to explain embodiments of the present invention. The diagram shows frequency variation or dithering as a function of time for one modulation cycle. The modulation cycle has a period tm and modulation frequency of 1/tm. The modulation curve illustrates fundamental frequency variations between minimum (fmin) and maximum (fmax) frequencies distributed about center frequency fc. A positive slope 500 of the modulation curve is defined by an incremental frequency increase (df) and a corresponding incremental time increase (dt) Likewise, a negative slope 502 of the modulation curve is defined by an incremental frequency decrease (−df) and a corresponding incremental time increase (dt). As will become evident in the following discussion, both positive and negative slopes are selected in a pseudorandom manner so that the modulation frequency is not constant. Incremental values of df and dt may vary along a single slope and with respect to different slopes. Moreover, although a triangular modulation curve is illustrated by way of example, other modulation curves may be employed according to various embodiments of the present invention.

Figure 6A:
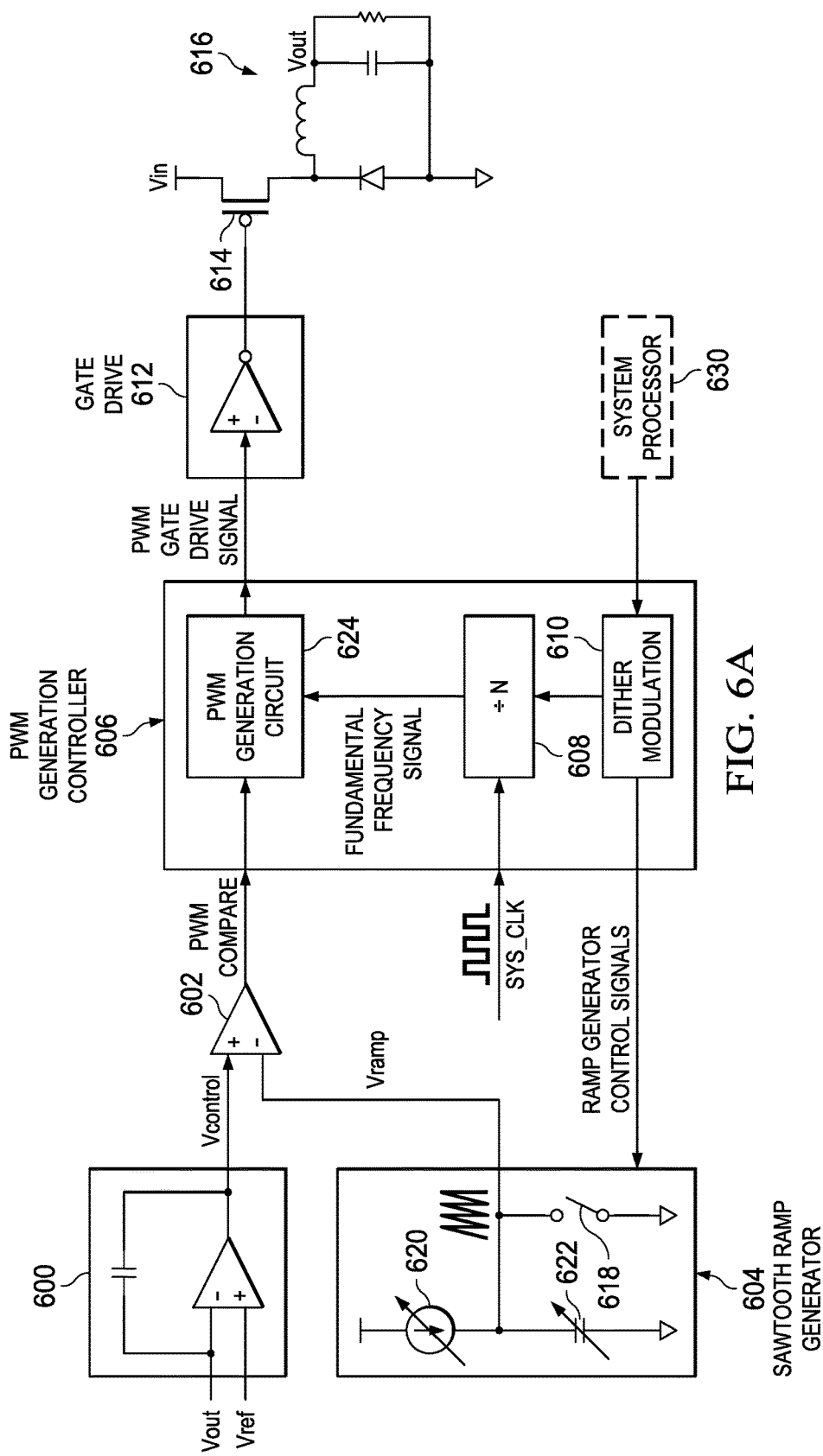
FIG. 6A is a simplified circuit diagram of a switched mode power supply according to the present invention.

Turning now to FIG. 6A, there is a simplified circuit diagram of a switched mode power supply according to the present invention. The circuit includes an error integrator circuit 600 to compare an output voltage Vout to a reference voltage Vref and produce control voltage Vcontrol. The circuit of FIG. 6A also includes a sawtooth ramp generator circuit 604 to produce a ramp voltage Vramp. Control voltage Vcontrol is applied to a positive input terminal of comparator 602. Ramp voltage Vramp is applied to a negative input terminal of comparator 602. Comparator 602 produces a pulse width modulation (PWM) compare signal that is applied to PWM generation control circuit 606. A system clock signal (SYS_CLK) is also applied to PWM generation control circuit 606. The system clock signal is divided by frequency divider 608 in response to dither modulation circuit 610 to produce various fundamental frequencies of a modulation curve. The PWM compare signal and the selected frequency are applied to PWM generation circuit 624 to control respective falling and rising edges of a PWM gate drive signal. The PWM gate drive signal is applied to gate drive circuit 612. Gate drive circuit 612 drives p-channel transistor 614 to produce a high level signal (Vout) at output circuit 616. Various operational functions of the switched mode power supply may be realized in hardware or in software by optional system processor 630.

In operation, error integrator circuit 600 receives reference voltage Vref, which is set to a desired output voltage. Output voltage Vout is also applied to error integrator circuit 600 and compared with Vref to produce control voltage Vcontrol. Vcontrol is an error voltage that corresponds to a difference between Vout and Vref. Sawtooth ramp generator circuit 604 operates synchronously with PWM generation control circuit 606 and produces a sawtooth ramp signal Vramp by charging programmable capacitor array 622 with programmable current source 620. Programmable current source 620 and programmable capacitor array 622 control the rising edge of Vramp so that the duty cycle of the PWM compare signal is held constant for each variation of its period. This advantageously reduces output voltage ripple during spread spectrum operation. Reset circuit 618 periodically discharges capacitor 622 to produce the falling edge of Vramp. Comparator 602 compares control signal Vcontrol with ramp signal Vramp to produce a PWM compare signal that is applied to PWM generation control circuit 606.

Figure 6B:
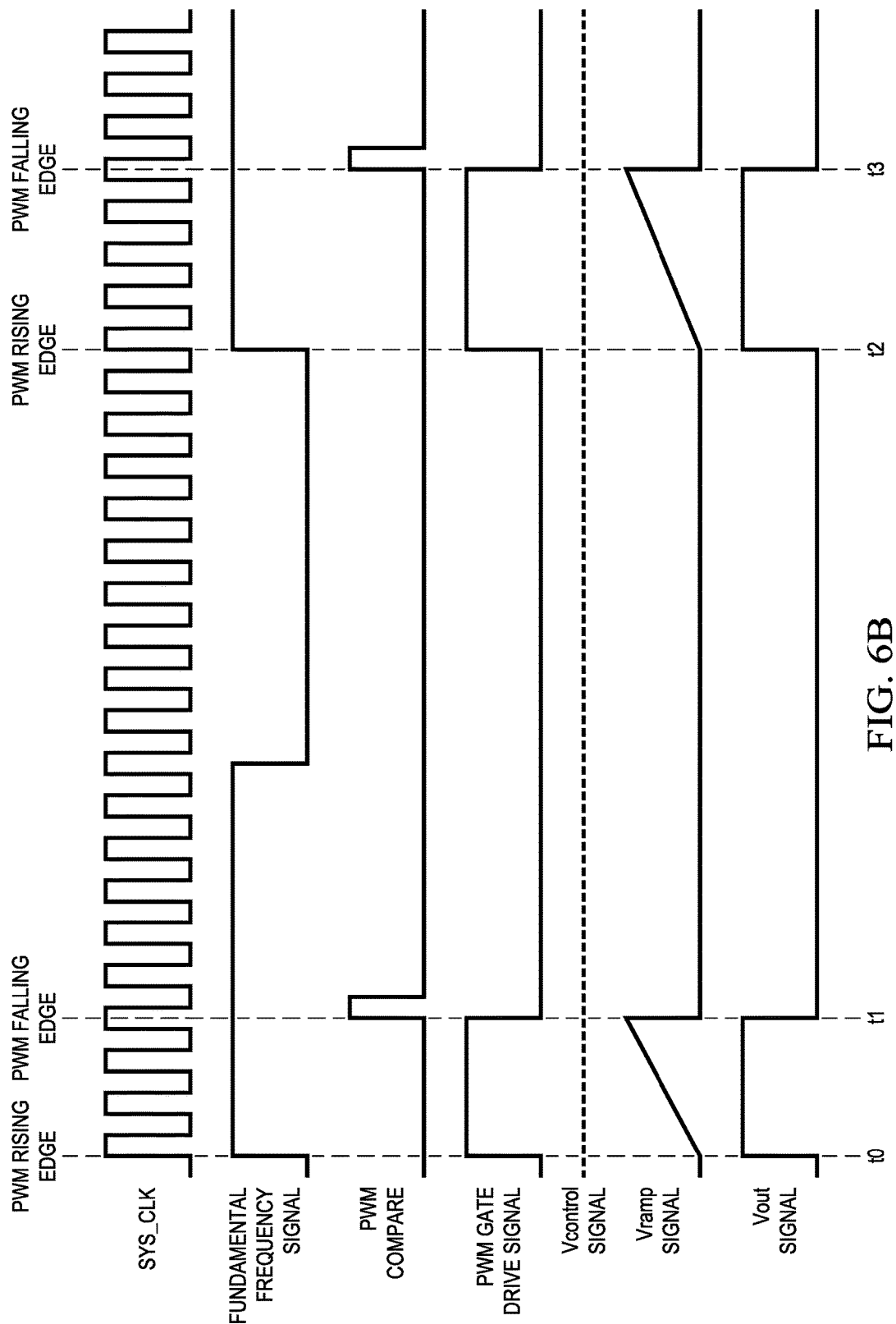
FIG. 6B is a timing diagram showing operation of the switched mode power supply of FIG. 6A.

Referring now to FIG. 6B, operation of PWM generation control circuit 606 will be explained in detail. PWM generation control circuit 606 receives system clock signal SYS_CLK. Frequency divider circuit 608 divides SYS_CLK by N, where N is a positive integer, in response to control signals from dither modulation circuit 610 to produce a fundamental frequency signal. For example, if SYS_CLK is a 64 MHz signal, N may vary from 27 to 32 to produce fundamental frequencies of 2.37 MHz to 2.0 MHz, respectively. PWM generation circuit 624 receives the PWM compare signal from comparator 602 and the fundamental frequency signal from frequency divider circuit 608. At time t0, the fundamental frequency signal goes high and causes the PWM gate drive signal to go high. Gate drive circuit 612 inverts the PWM gate drive signal to turn on p-channel transistor 614. Output voltage Vout is correspondingly switched high and Vramp signal rises until reaching the Vcontrol signal causing the PWM compare signal goes high at time t1. The high level of PWM compare causes the PWM gate drive signal to fall, thereby turning off p-channel transistor 614 via gate drive circuit 612. P-channel transistor 614 remains off until time t2 when the fundamental frequency signal again goes high. The high level of the fundamental frequency signal causes the PWM gate drive signal to go high and turn on p-channel transistor 614. Here output voltage Vout is switched high and the Vramp signal rises until reaching the Vcontrol signal where the PWM compare signal again goes high at time t3. The high level of the PWM compare signal causes the PWM gate drive signal to fall, thereby turning off p-channel transistor 614. P-channel transistor 614 remains off until the next positive transition of the fundamental frequency signal. In this manner, the on time (t0 to t1) and off time (t1 to t2) are modulated to keep Vout approximately equal to Vref under variable load conditions.

Figure 7A:
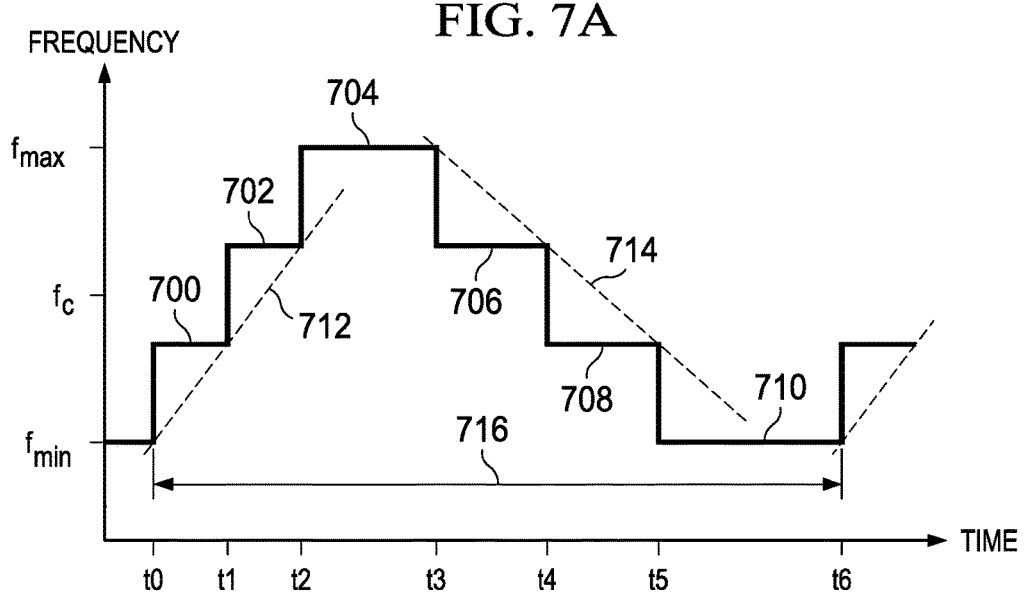
FIG. 7A is a diagram illustrating a simplified modulation curve according to the present invention.

Referring now to FIG. 7A, there is a diagram illustrating a simplified triangular modulation curve according to the present invention. The modulation curve shows a range of discrete fundamental frequencies as a function of time. There are four discrete frequencies from fmin to fmax with a center frequency fc. The modulation curve begins at frequency fmin at time t0, where the frequency increases by df to a second frequency 700. The oscillation frequency 700 continues for duration dt1 until time t1. The frequency again increases by df to a third frequency 702. The oscillation frequency 702 continues for duration dt1 until time t2. The frequency finally increases by df to a fourth frequency fmax 704. The stepwise increase of the modulation curve from fmin to fmax has a positive slope 712 of df/dt1. The positive slope is determined by pseudorandom selection and, therefore, determines dt1 for the modulation curve. At time t3, the frequency decreases by df to the third frequency 706. The oscillation frequency 706 continues for duration dt2 until time t4. The frequency again decreases by df to the second frequency 708. The oscillation frequency 708 continues for duration dt2 until time t5. The frequency finally decreases by df to the first frequency fmin 710 to complete the modulation curve having period 716. The stepwise decrease of the modulation curve from fmax to fmin has a negative slope 714 of −df/dt2. The negative slope is also determined by pseudorandom selection separately from the positive slope and, therefore, determines dt2 for the modulation curve.

Figure 7B:
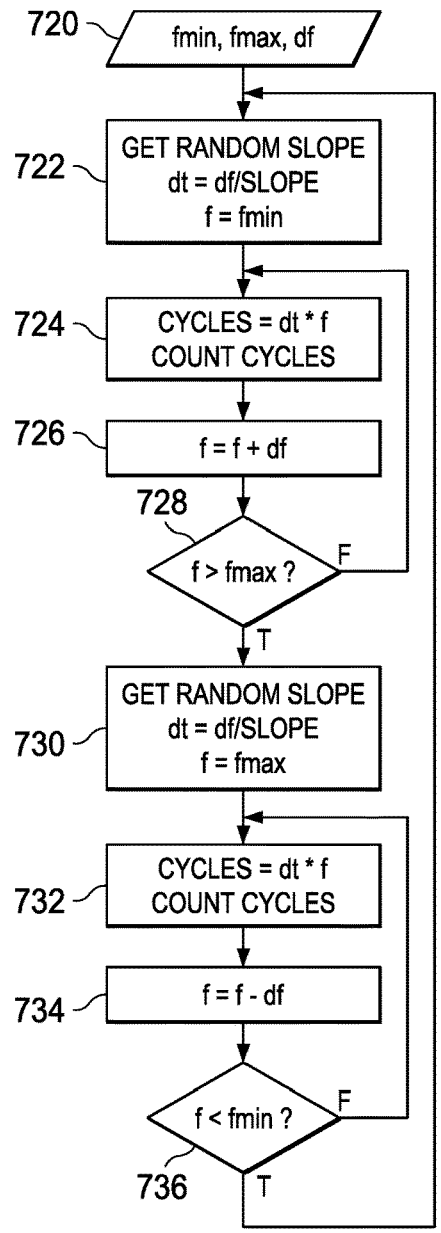
FIG. 7B is a flow diagram according to one embodiment of the present invention that may be used to produce the modulation curve of FIG. 7A.

Referring next to FIG. 7B, there is a flow diagram according to an embodiment of the present invention that may be used to produce the modulation curve of FIG. 7A. The diagram begins at step 720 with inputs of minimum frequency fmin, maximum frequency fmax, and differential frequency df. At step 722 a pseudorandom slope (SLOPE) is selected. SLOPE preferably has a value between a minimum and maximum value. Then duration dt is set equal to df/SLOPE, and the current frequency is set to fmin. A cycle count variable (CYCLES) is set to dt*f at step 724. This is a number of cycles of frequency f corresponding to duration dt. The PWM circuit (FIG. 6A) then oscillates for time dt at frequency f. At step 726, the current frequency f is increased by df, corresponding to the increase from fmin to frequency 700 (FIG. 7A). Test 728 determines if the current frequency f is greater than fmax. If not, control transfers to step 724. At step 724 a new cycle count (CYCLES) is calculated, since more cycles at frequency 700 correspond to time dt. The PWM circuit again oscillates for time dt at frequency f. At step 726, the current frequency f is again increased by df, corresponding to the increase from frequency 700 to frequency 702 (FIG. 7A). Test 728 again determines if the current frequency f is greater than fmax. If not, the process repeats until test 728 determines the current frequency f is greater than fmax. Then control transfers to step 730 where another pseudorandom slope (SLOPE) is selected. Then duration dt is set equal to df/SLOPE, and the current frequency is set to fmax. A cycle count variable (CYCLES) is set to dt*f at step 732. This is a number of cycles of frequency f corresponding to duration dt. The PWM circuit (FIG. 6A) then oscillates for time dt at frequency f. At step 734, the current frequency f is decreased by df, corresponding to the decrease from fmax to frequency 706 (FIG. 7A). Test 736 determines if the current frequency f is less than fmin. If not, control transfers to step 732. At step 732 a new cycle count (CYCLES) is calculated, since fewer cycles at frequency 706 correspond to time dt. The PWM circuit again oscillates for time dt at frequency f. At step 734, the current frequency f is again decreased by df, corresponding to the decrease from frequency 706 to frequency 708 (FIG. 7A). Test 736 again determines if the current frequency f is less than fmin. If not, the process repeats until test 736 determines the current frequency f is less than fmin. Then control transfers to step 722 to repeat another pseudorandom positive slope of the modulation curve. This embodiment of the present invention recalculates the number of cycles at each step of the modulation curve for a transition between fmin and fmax. This advantageously produces a triangular modulation curve with a linear slope. The recalculation, however, requires additional computation.

Computation such as pseudorandom slope and differential time determination at steps 722-724 and 730-732 may be accomplished by the optional system processor 630 (FIG. 6A). Fundamental frequency cycle counts may be accomplished in hardware by either PWM generation circuit 624 or dither modulation circuit 610 or in software by the system processor 630. Other embodiments will be apparent to those of ordinary skill in the art having access to the instant specification.

Figure 7C:
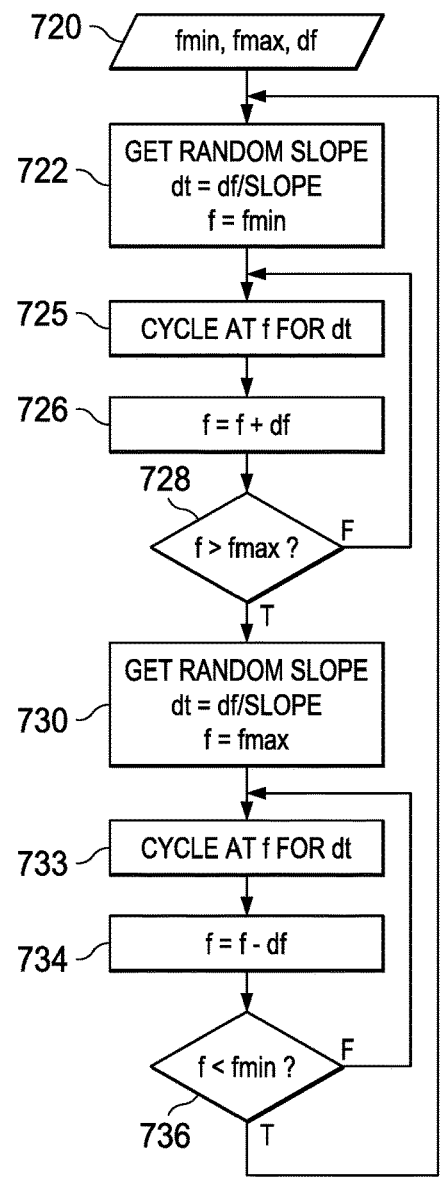
FIG. 7C is a flow diagram according to another embodiment of the present invention that may be used to produce the modulation curve of FIG. 7A.

FIG. 7C is a flow diagram according to another embodiment of the present invention that may be used to produce the modulation curve of FIG. 7A. The diagram of FIG. 7C is the same as the diagram of FIG. 7B except that step 724 is replaced by step 725 and step 732 is replaced by step 733. The embodiment of FIG. 7C, therefore, does not require a cycle count of current frequency f to determine duration dt. Duration dt may be determined by a timed interrupt, a system clock, a sawtooth ramp generator, or any other suitable digital or analog method. Moreover, dt values may be preselected in a pseudorandom manner to produce non-symmetrical rising and falling transitions of the modulation curve.

Figure 8A:
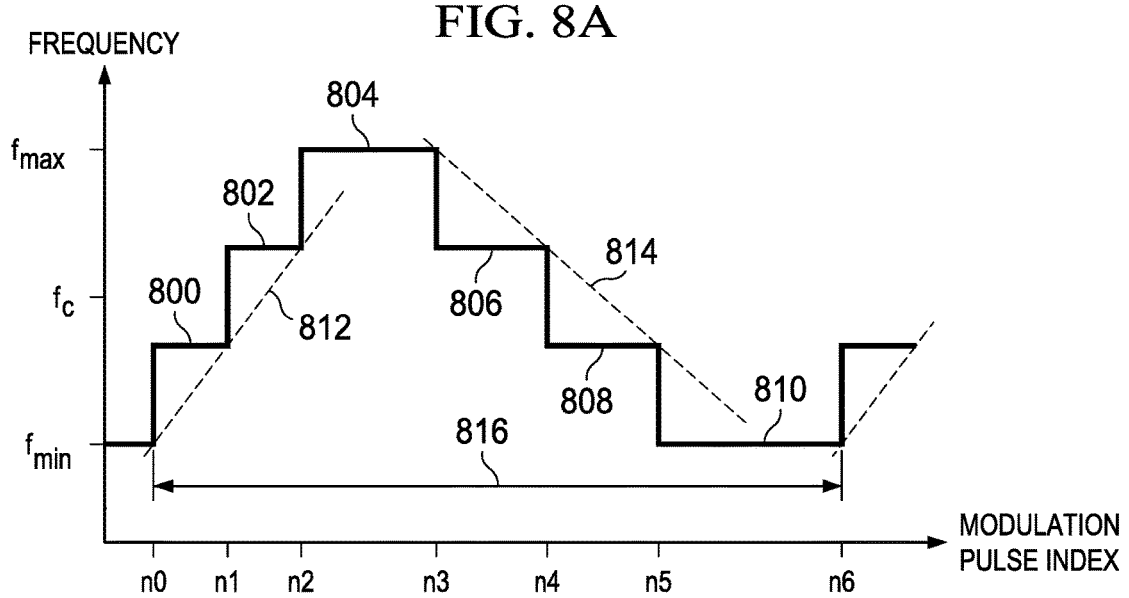
FIG. 8A is a diagram illustrating a simplified modulation curve according to another embodiment of the present invention.

Referring now to FIG. 8A, there is a diagram illustrating a simplified triangular modulation curve according to the present invention. The modulation curve shows a range of discrete fundamental frequencies as a function of modulation pulse index, n. The modulation pulse index refers to the index of a specific pulse in the sequence of PWM pulses in a modulation curve. There are four discrete frequencies from fmin to fmax with a center frequency fc. The modulation curve begins at frequency fmin at modulation pulse index n0, where the frequency increases by df to a second frequency 800. The oscillation frequency 800 continues for number of pulses dn1 until modulation pulse index n1. In other words, dn1 indicates the number of times oscillation frequency 800 is repeated before increasing by df to a third frequency 802. The corresponding time duration spent oscillating at frequency 800=t1=dn1*1/f_800, where f_800 indicates the oscillation frequency 800. The oscillation frequency 802 continues for number of pulses dn1 until modulation pulse index n2. Then the frequency finally increases by df to a fourth frequency fmax 804. The stepwise increase of the modulation curve from fmin to fmax has a positive slope 812 of df/dn1. The positive slope is determined by pseudorandom selection and, therefore, determines dn1 for the modulation curve. At modulation pulse index n3, the frequency decreases by df to the third frequency 806. The oscillation frequency 806 continues for a number of pulses dn2 until modulation pulse index n4. The frequency again decreases by df to the second frequency 808. The oscillation frequency 808 continues for a number of pulses dn2 until modulation pulse index n5. At n5 the frequency finally decreases by df to the first frequency fmin 810 to complete the modulation curve having total number of modulation pulses 816. The stepwise decrease of the modulation curve from fmax to fmin has a negative slope 814 of −df/dn2. The negative slope is also determined by pseudorandom selection separately from the positive slope and, therefore, determines dn2 for the modulation curve.

Figure 8B:
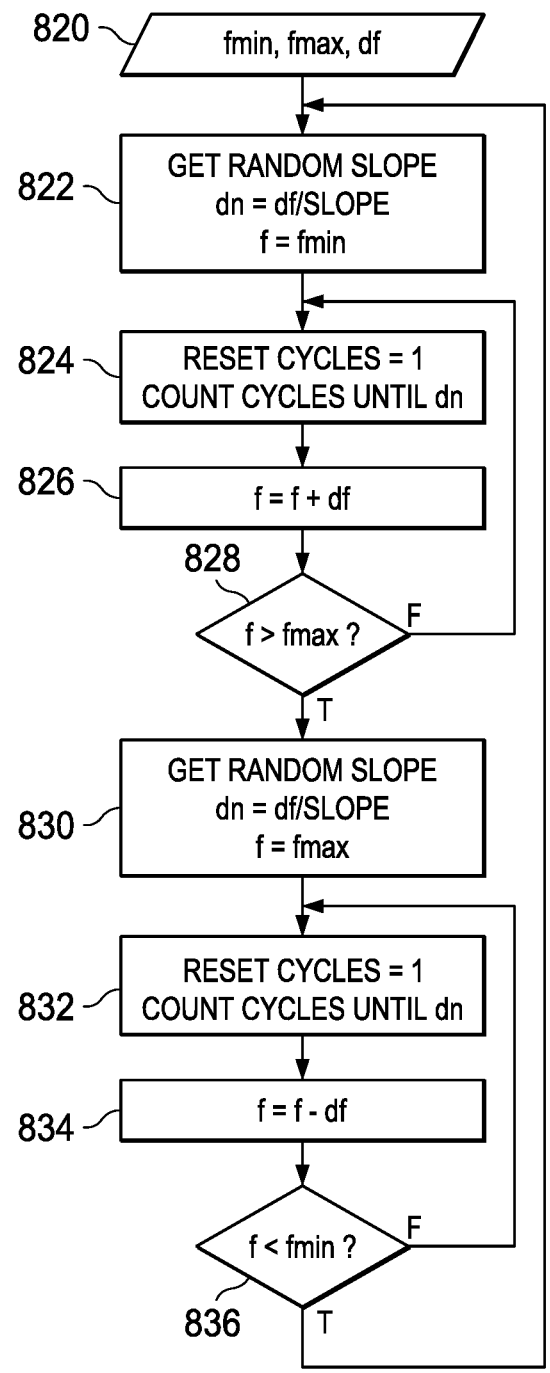
FIG. 8B is a flow diagram according to yet another embodiment of the present invention that may be used to produce the modulation curve of FIG. 8A.

Referring next to FIG. 8B, there is a flow diagram according to yet another embodiment of the present invention that may be used to produce the modulation curve of FIG. 8A. The diagram begins at step 820 with inputs of minimum frequency fmin, maximum frequency fmax, and differential frequency df. At step 822 a pseudorandom slope (SLOPE) is selected. SLOPE preferably has a value between a minimum and maximum value. The number of modulation pulses dn is set equal to df/SLOPE, and the current frequency is set to fmin. A cycle count variable (CYCLES) is reset to 1 at step 824. This is a number of integer oscillation cycles of frequency f corresponding to duration dt=dn*1/f=dn/f. The PWM circuit (FIG. 6A) then oscillates for dn oscillations at frequency f. At step 826, the current frequency f is increased by df, corresponding to the increase from fmin to frequency 800 (FIG. 8A). Test 828 determines if the current frequency f is greater than fmax. If not, control transfers to step 824. At step 824 cycle count variable (CYCLES) is reset to 1. The PWM circuit again oscillates for time dt=dn*1/f=dn/f at the updated frequency f. At step 826, the current frequency f is again increased by df, corresponding to the increase from frequency 800 to frequency 802 (FIG. 8A). Test 828 again determines if the current frequency f is greater than fmax. If not, the process repeats until test 828 determines the current frequency f is greater than fmax. Then control transfers to step 830 where another pseudorandom slope (SLOPE) is selected. The number of modulation pulses dn is set equal to df/SLOPE, and the current frequency is set to fmax. A cycle count variable (CYCLES) is reset to 1 at step 832. This is a number of integer oscillation cycles of frequency f corresponding to duration dt=dn*1/f=dn/f. The PWM circuit (FIG. 6A) then oscillates for time dt at frequency f. At step 834, the current frequency f is decreased by df, corresponding to the decrease from fmax to frequency 806 (FIG. 8A). Test 836 determines if the current frequency f is less than fmin. If not, control transfers to step 832. At step 832 cycle count variable (CYCLES) is reset to 1. The PWM circuit again oscillates for time dt=dn*1/f=dn/f at the updated frequency f. At step 834, the current frequency f is again decreased by df, corresponding to the decrease from frequency 806 to frequency 808 (FIG. 8A). Test 836 again determines if the current frequency f is less than fmin. If not, the process repeats until test 836 determines the current frequency f is less than fmin. Then control transfers to step 822 to repeat another pseudorandom positive slope of the modulation curve. The embodiment of FIG. 8B is similar to the embodiments of FIGS. 7B and 7C except that the number of cycles at each step of the modulation curve for a transition between fmin and fmax remains constant. This advantageously eliminates the need to recalculate do for each fundamental frequency change. As a result, however, the slope of each transition between fmin and fmax is nonlinear.

Figure 1B:
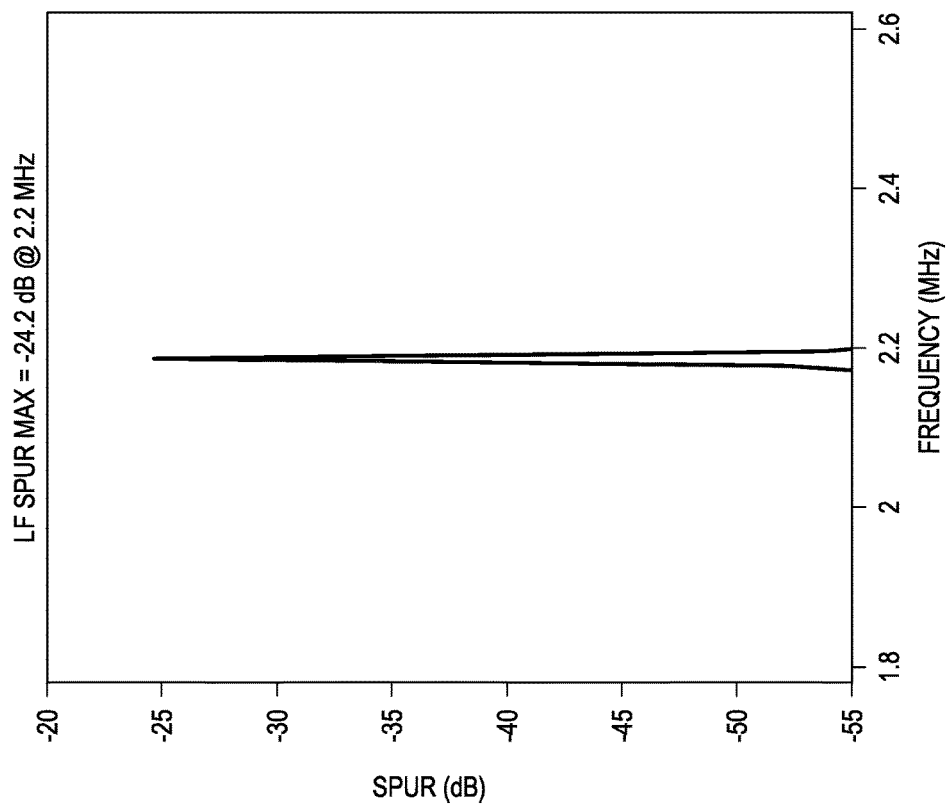
FIGS. 1A and 1B are spectral energy diagrams of respective low frequency and fundamental frequency energy distribution for a square wave with no spread spectrum switching.
Figure 1A:
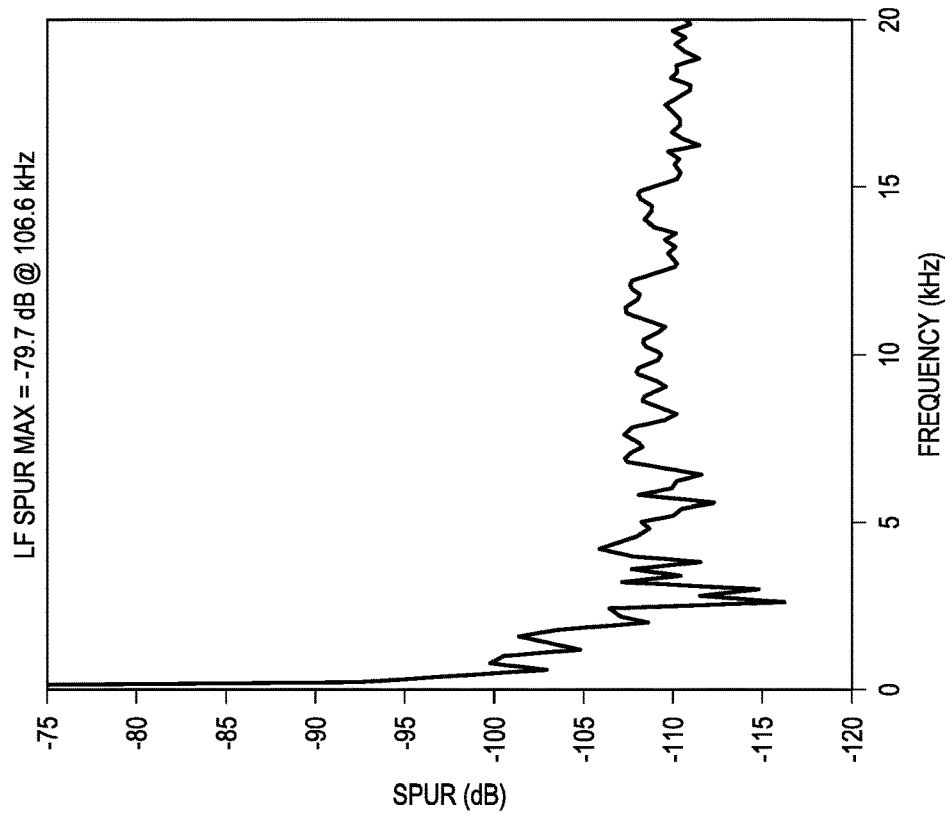
Figure 2B:
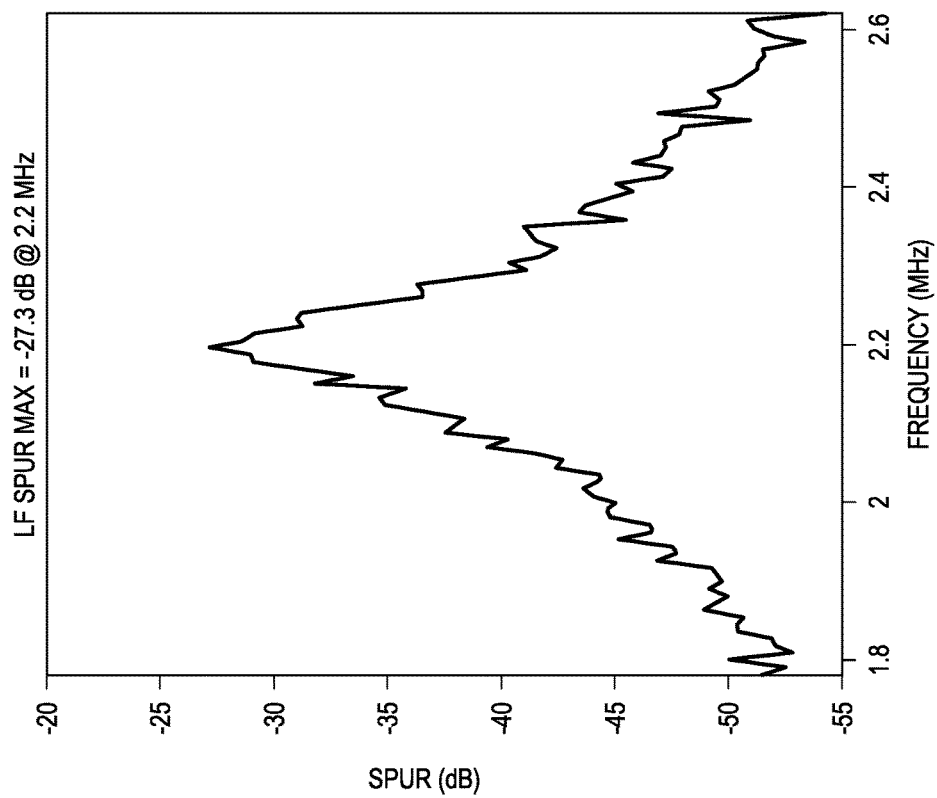
FIGS. 2A and 2B are spectral energy diagrams of respective low frequency and fundamental frequency energy distribution for pseudorandom fundamental frequency spread spectrum switching.
Figure 2A:
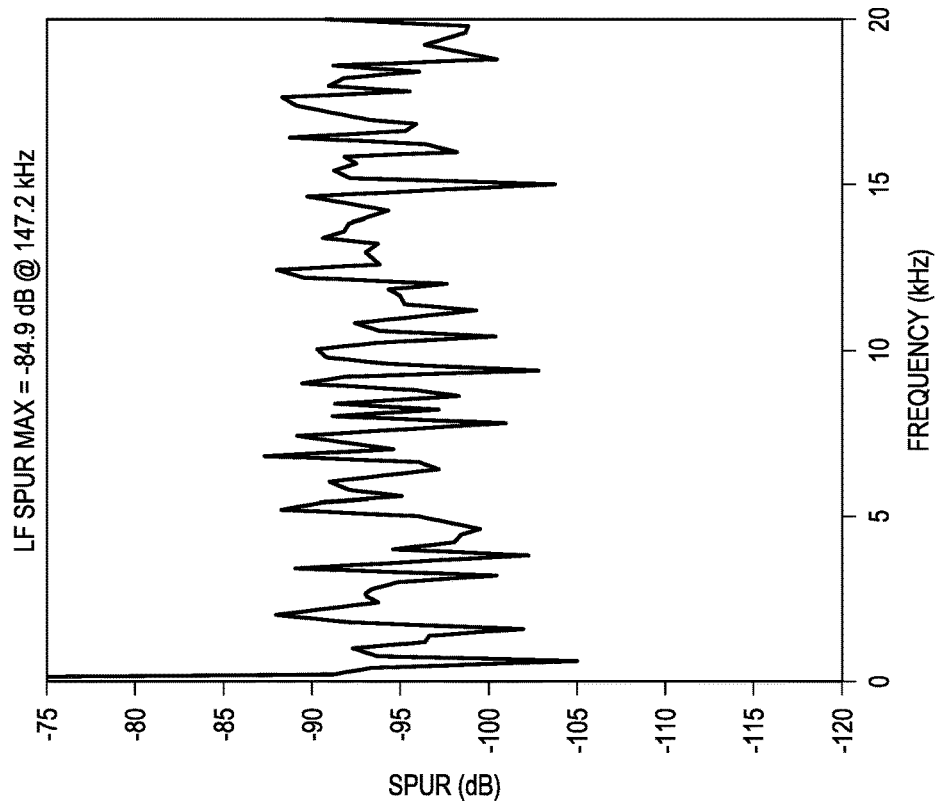
Figure 3B:
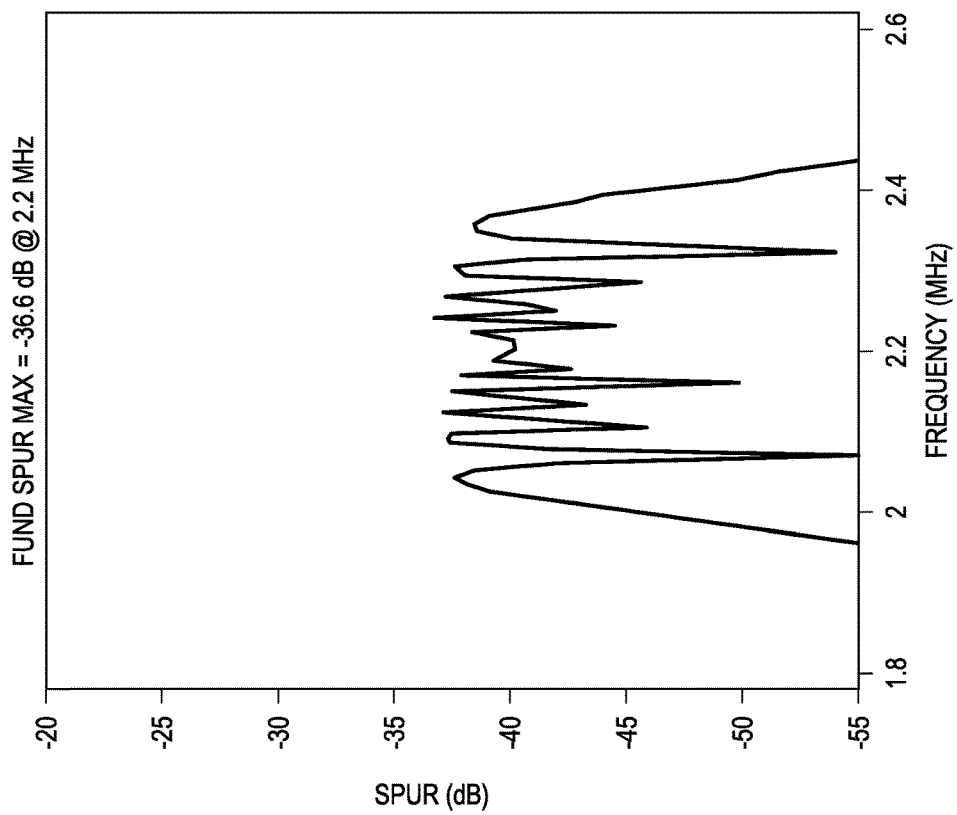
FIGS. 3A and 3B are spectral energy diagrams of respective low frequency and fundamental frequency energy distribution for fixed pattern, triangular modulation with fundamental frequency spread spectrum switching.
Figure 3A:
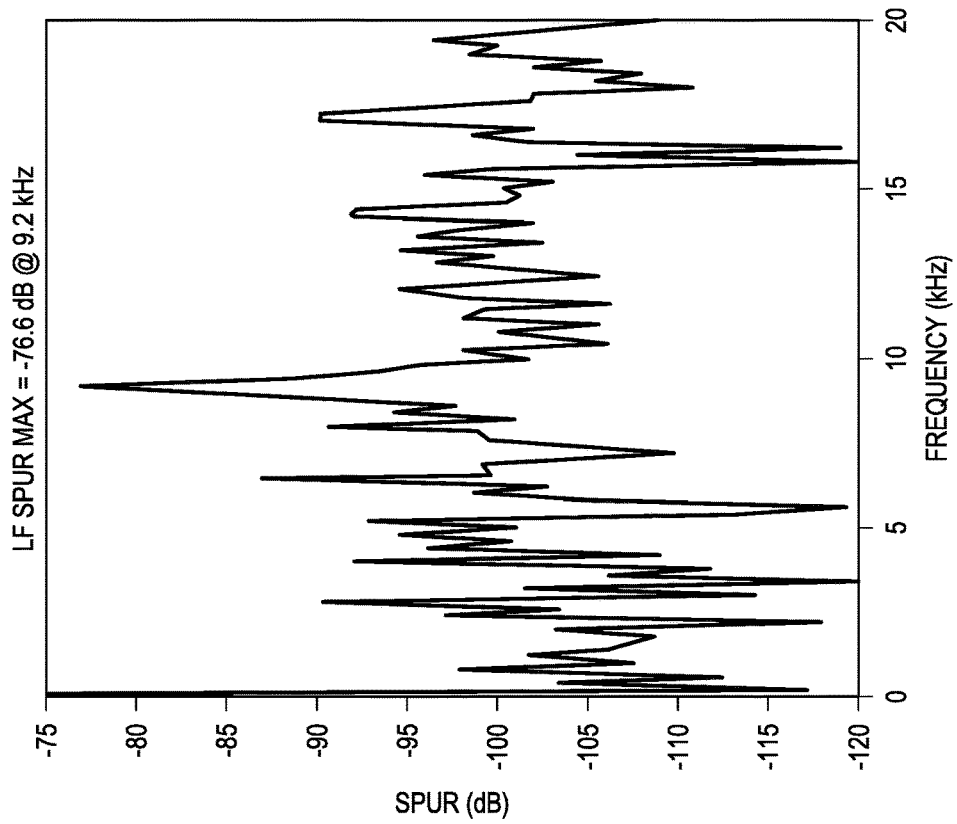
Figure 4B:
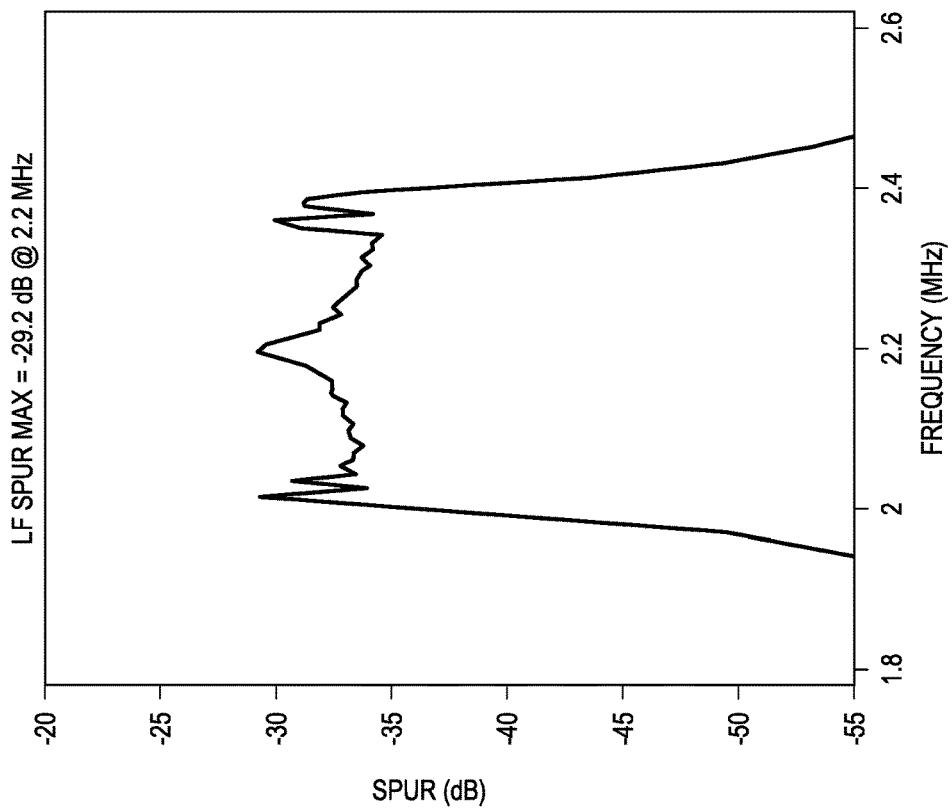
FIGS. 4A and 4B are spectral energy diagrams of respective low frequency and fundamental frequency energy distribution for fixed pattern, Hershey Kiss modulation with fundamental frequency spread spectrum switching.
Figure 4A:
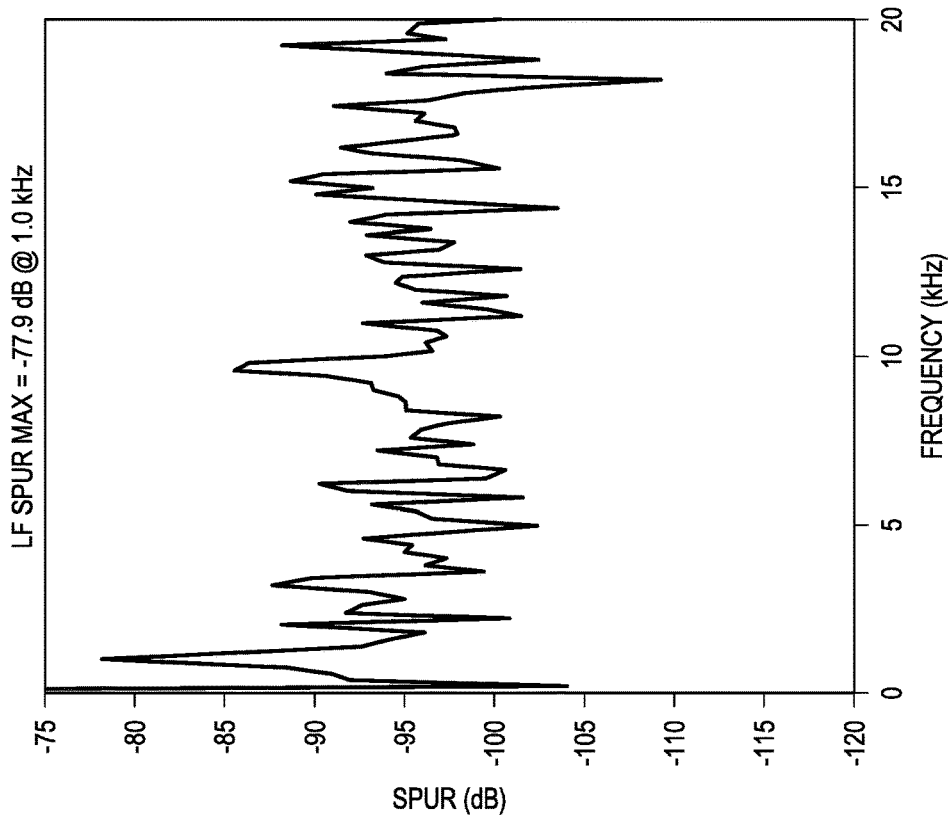
Figure 9B:
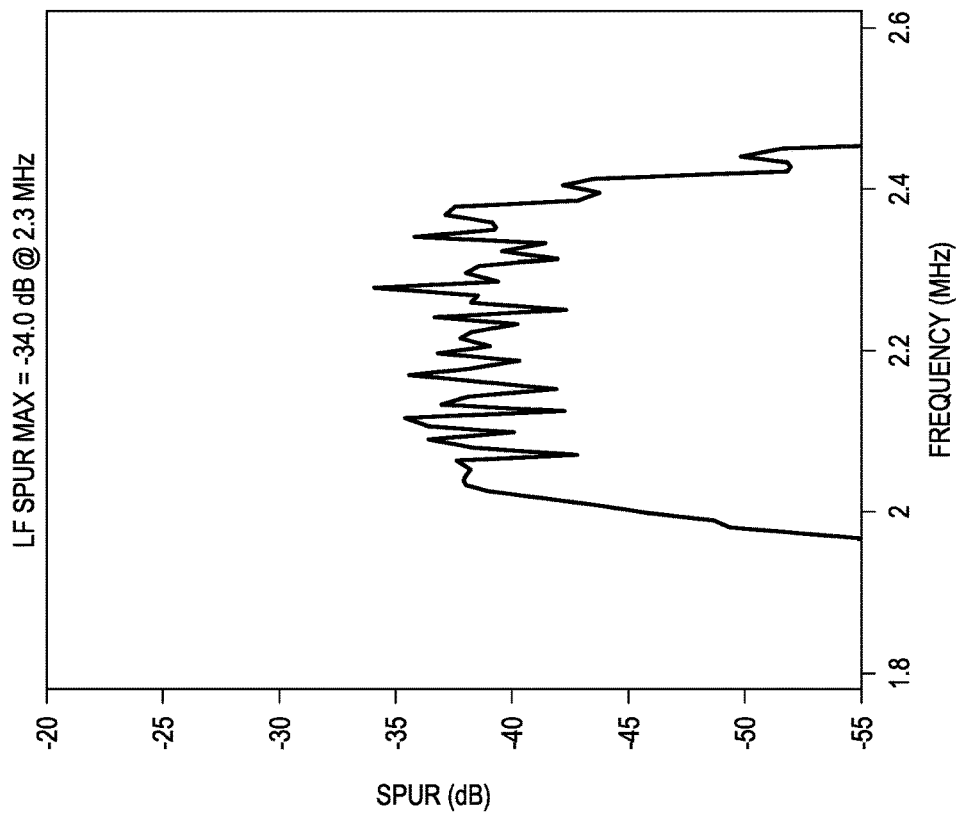
FIGS. 9A and 9B are spectral energy diagrams of respective low frequency and fundamental frequency energy distribution for a triangular modulation curve with a pseudorandom modulation frequency according to the present invention.
Figure 9A:
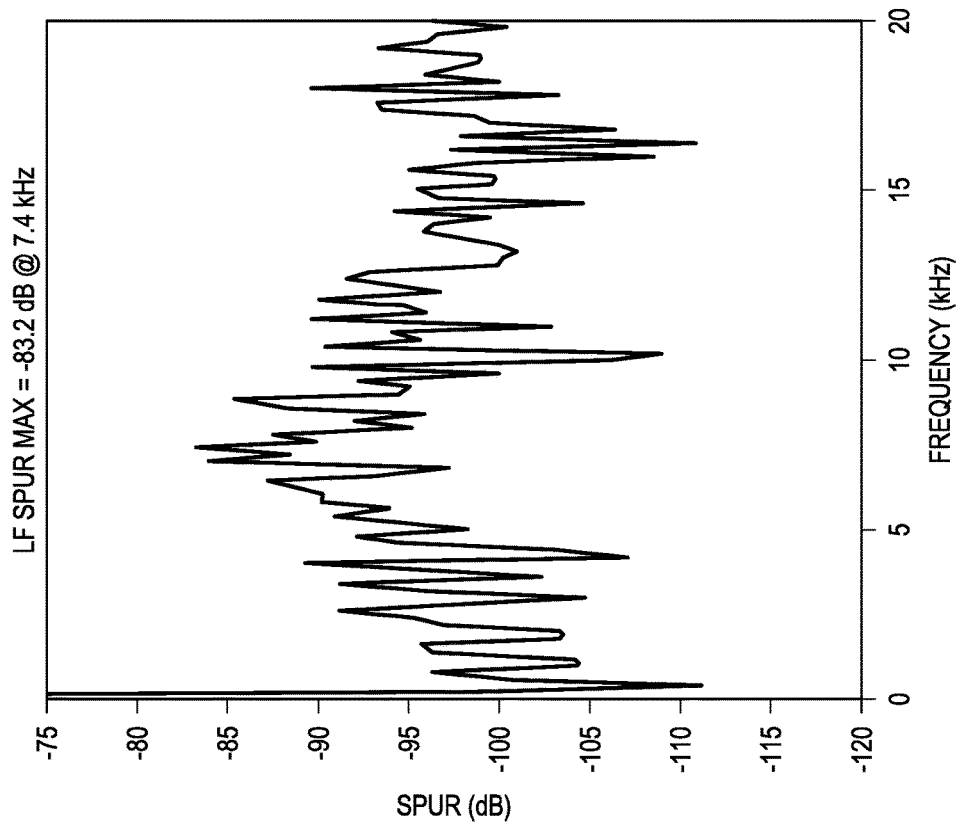

The foregoing embodiments of the present invention significantly reduce EMI by reducing low frequency noise spurs due to the modulation frequency while maintaining low EMI at the fundamental operating frequencies. This improvement is illustrated by comparing the diagrams of prior art FIGS. 3A and 3B with diagrams of respective FIGS. 9A and 9B according to the present invention. FIG. 3A illustrates a low frequency spectrum having a dominant EMI spur of −76.6 dB at 9.2 kHz. By way of comparison, FIG. 9A illustrates a low frequency spectrum having a dominant EMI spur of −83.2 dB at 7.4 kHz. This is a significant reduction of 6.6 dB of the peak low frequency noise spur. FIG. 3B illustrates the spectral energy of a fixed pattern, triangular modulation curve of the prior art with a 2.2 MHz center frequency. The spectral energy is spread between 2.0 MHz and 2.4 MHz with a maximum of −36.6 dB. FIG. 9B of the present invention illustrates a triangular modulation curve with pseudorandom modulation frequency. The maximum EMI spur is −34.0 dB at 2.3 MHz. The present invention, therefore, advantageously reduces the maximum low frequency spur by 6.6 dB. The corresponding increase of the maximum fundamental spur by 2.6 dB is less significant than the reduced EMI spur in the low frequency audio band. Moreover, this improvement is accomplished without the benefit of expensive solutions such as filtering and shielding.

FIG. 10 is a diagram of a dither profile showing fundamental frequency variation of four modulation curves as a percent of the center frequency with a pseudorandom modulation frequency. Each positive or negative slope of each modulation curve is determined by pseudorandom selection between minimum and maximum slope values. Thus, low frequency spectral energy due to modulation frequency is advantageously distributed over a wider bandwidth with lower maximum energy.

Still further, while numerous examples have thus been provided, one skilled in the art should recognize that various modifications, substitutions, or alterations may be made to the described embodiments while still falling within the inventive scope as defined by the following claims. For example, pseudorandom slope selection is not limited to triangular modulation curves and may be advantageously applied to any modulation curve to reduce the maximum magnitude of low frequency energy spurs. Moreover, pseudorandom slope selection may be accomplished by preselecting different values for dt (FIGS. 7A-7C) or for do (FIGS. 8A-8B) that provide adjacent nonsymmetrical rising and falling transitions of a modulation curve. Other combinations will be readily apparent to one of ordinary skill in the art having access to the instant specification.

The invention claimed is:

1. A method of generating a spread spectrum oscillating signal and clocking an operational circuit with the spread spectrum oscillating signal, the method comprising:
   a) selecting a first pseudorandom slope for a rising transition of a modulation curve from a minimum frequency to a maximum frequency;
   b) setting a current frequency for the rising transition to the minimum frequency;
   c) producing a portion of the oscillating signal at the current frequency for a time period corresponding to the current frequency;
   d) setting the current frequency to a next frequency for the rising transition of the modulation curve;
   e) repeating steps c) and d) until the current frequency is the maximum frequency; and
   operating the operational circuit in response to the oscillating signal.

2. The method of claim 1, wherein the modulation curve is a nonlinear modulation curve.

3. The method of claim 1, wherein the first pseudorandom slope is equal to a difference between the current frequency and the next frequency, divided by the time period.

4. The method of claim 1, wherein the time period of step c) is determined by the first pseudorandom slope.

5. The method of claim 1, wherein step d) comprises incrementing the current frequency.

6. The method of claim 1, further comprising:
f) selecting a second pseudorandom slope for a falling transition of the modulation curve from the maximum frequency to the minimum frequency;
g) setting the current frequency for the falling transition to the maximum frequency;
h) producing a portion of the oscillating signal at the current frequency for a time period corresponding to the current frequency;
i) setting the current frequency to a next frequency for the falling transition of the modulation curve; and
j) repeating steps h) and i) until the current frequency is the minimum frequency.

7. The method of claim 6, wherein the time period of step h) is determined by the second pseudorandom slope.

8. The method of claim 6, wherein step i) comprises decrementing the current frequency.

9. The method of claim 1, wherein the operational circuit comprises a switched mode power supply.

10. A method of generating a spread spectrum oscillating signal and clocking an operational circuit with the spread spectrum oscillating signal, the method comprising:
selecting a minimum frequency (fmin) and a maximum frequency (fmax);
selecting a first transition curve for a first duration in a first time period from fmin to fmax;
producing first portions of the oscillating signal at a plurality of frequencies from fmin to fmax according to the first transition curve;
selecting a second transition curve for a second duration in a second time period from fmax to fmin, the second duration being different from the first duration, and the second time period being different from the first time period;
producing second portions of the oscillating signal at the plurality of frequencies from fmax to fmin according to the second transition curve; and
operating the operational circuit in response to the oscillating signal.

11. The method of claim 10, wherein the first transition curve has a first stepwise linear transition having a positive slope, and the second transition curve has a second stepwise linear transition having a negative slope.

12. The method of claim 10, wherein the first transition curve has a first stepwise nonlinear transition, and the second transition curve has a second stepwise nonlinear transition.

13. The method of claim 10, wherein selecting the first transition curve comprises selecting the first transition curve as a first pseudorandom selection, and selecting the second transition curve comprises selecting the second transition curve as a second pseudorandom selection.

14. The method of claim 10, wherein the plurality of frequencies are discrete frequencies produced by a frequency divider.

15. The method of claim 10, wherein the operational circuit comprises a switched mode power supply.

* * * * *